United States Patent [19]

Dolzhenkov et al.

[11] 4,236,917
[45] Dec. 2, 1980

[54] METHOD OF GAS-DYNAMIC STIRRING OF LIQUID MOLTEN METALS AND APPARATUS FOR PERFORMING SAME

[76] Inventors: Boris S. Dolzhenkov, ulitsa Aerodromnaya, 87, kv. 2; Igor A. Partin, ulitsa Svobody, 230, kv. 164, both of Kuibyshev; Leonid A. Loginov, ulitsa Mariny Raskovoi, 30, kv. 65, Moscow; Genrikh I. Kabakov, ulitsa 1905 goda, 2 proseka, 9, Moskovskaya oblast, Odintsovsky raion, poselok Zhavoronki; Jury N. Lanin, ulitsa Fizkulturnaya, 13, kv. 66, Kuibyshev; Sergei G. Turanin, ulitsa Gvardeiskaya, 19, kv. 134, Kuibyshev; Viktor I. Plokhov, ulitsa Stroitelei, 20, kv. 75, Kuibyshev; Sergei S. Semin, ulitsa Svobody, 184, kv. 63, Kuibyshev; Gershon D. Dymov, ulitsa Respublikansakaya, 59, kv. 26, Kuibyshev; Gennady V. Cherepok, prospekt Metallurgov, 73, kv. 54, Kuibyshev, all of U.S.S.R.

[21] Appl. No.: 927,597

[22] Filed: Jul. 21, 1978

[51] Int. Cl.$^3$ .......................... C22B 9/00; C21C 7/00
[52] U.S. Cl. ...................... 75/93 R; 75/49; 75/61
[58] Field of Search .................. 75/61, 93 R, 49

[56] References Cited

U.S. PATENT DOCUMENTS

| | | | |
|---|---|---|---|
| 3,321,300 | 5/1967 | Worner | 75/49 |
| 3,573,895 | 4/1971 | Ostberg | 75/61 |
| 3,607,228 | 9/1971 | Todd | 75/61 |
| 3,820,767 | 6/1974 | Metz | 75/93 R |

Primary Examiner—P. D. Rosenberg
Attorney, Agent, or Firm—Haseltine, Lake & Waters

[57] ABSTRACT

Directly prior to the supplying of the expelling pulse of compressed gas into the pump tube, the suction supply is cut off, whereby the withdrawn portion of metal is expelled into the molten metal body under the action of the sum of its own weight and the compressed-gas pulse.

To ensure the accurate timing of the suction cut-off moment and the gas pulse supply, the cover of the pump has mounted therein rod valves cooperating with a floating sleeve having its float actuated by the molten metal. The cover has also mounted therein at least one electric contact probe wired into the circuit controlling the supply of compressed gas pulses. The cutting-off of the suction is effected by the molten of an inner nozzle in an outer one, the nozzles being arranged at the intersection of the suction line and the compressed gas supply line.

3 Claims, 8 Drawing Figures

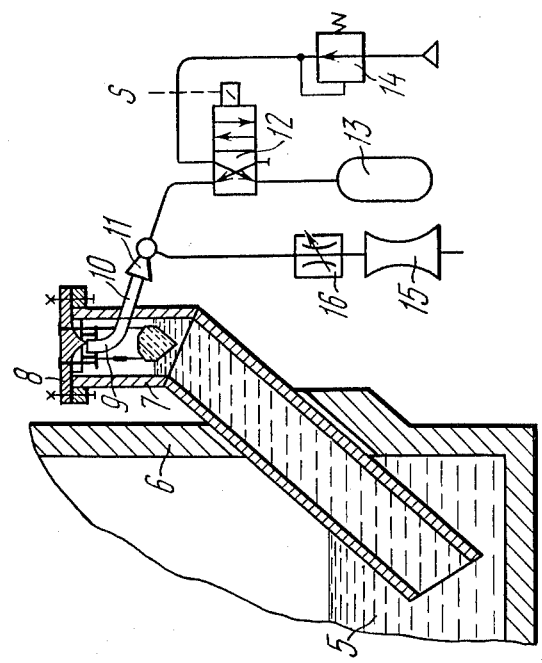
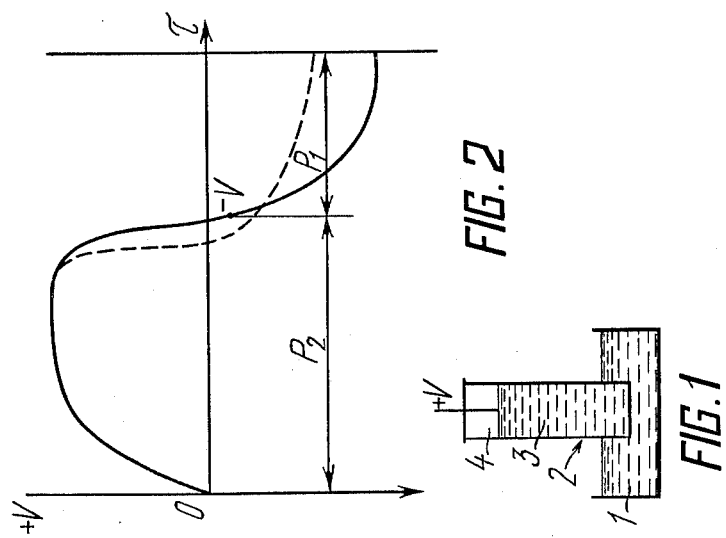

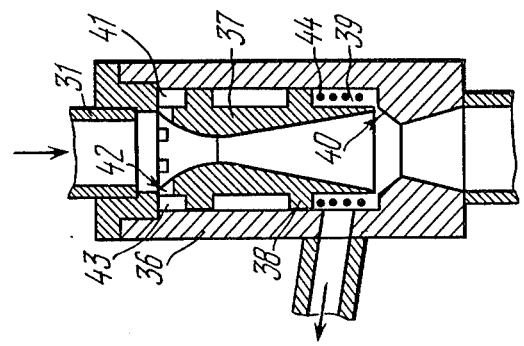
FIG. 8
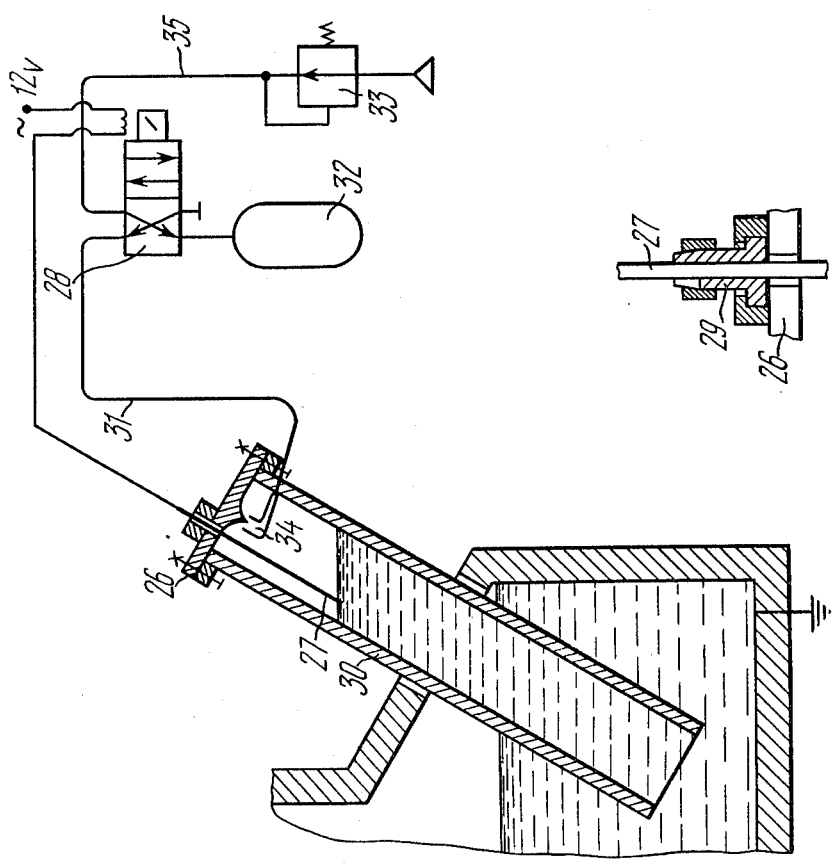
FIG. 7
FIG. 6

METHOD OF GAS-DYNAMIC STIRRING OF LIQUID MOLTEN METALS AND APPARATUS FOR PERFORMING SAME

The present invention relates to the metallurgical industry, and more particularly it relates to methods of stirring liquid metals being molten directly in the metal baths of melting furnaces, which stirring more often than not speeds up the melting process, promotes the homogeneity of the chemical composition of the molten metal body and enhances a uniform temperature field of this molten metal body.

At present, there are already known methods of stirring liquid metals directly in the bath of a melting furnace, viz. the mechanical method, the electromagnetic method, the gas-dynamic method and others. The present invention relates to the most simple and promising one of these methods, namely, the method of gas-dynamic stirring of liquid metals, particularly such corrosive ones as aluminum alloys and the like.

This known per se general method, although yielding definite advantages in the productivity of the melting process, is not free from serious drawbacks. The permanent time interval between the compressed-gas pulses acting upon a metal portion in the tube, which may be the optimum one for one of the stages, is not, however, the optimum one for the two other stages.

Moreover, the energy of the compressed gas is far not completely employed for the acceleration of the metal in the tube to the required speed. This is explained by the fact that the considerable part of the energy of a compressed-gas pulse is spent on arresting the metal in the tube within the period of withdrawing it from the bath. A portion of this energy is spent directly on arresting the metal, while the other portion is spent on cutting off the suction from the working space of the pump; and it is only the rest of the energy of the pulse which is used to accelerate the metal to a certain speed. Obviously, more often than not it is practically impossible to attain the required speed of the outflow of the metal from the tube, this speed being, however, essential for the effectiveness of the stirring of the metal. On the other hand, it is not altogether advisable to follow the path of increasing the initial energy of a compressed-gas pulse, since the counter-action of the metal rising in the tube and of the compressed-gas flow arresting the progress of the metal results, as a rule, in a certain degree of gas saturation of the metal.

Thus, if the pulse energy is stepped up, it is quite natural to expect that the gas content in the metal would grow, which is undesirable.

The present invention is aimed at intensifying the process of stirring molten metal, e.g. of molten aluminum and its alloys in combustion reverberatory furnaces of a great capacity, particularly those of a rectangular cross-section, wherein the depth of the body of the molten metal is a fraction of the length of the furnace.

There are known a method and an apparatus for stirring molten metal, disclosed in the U.S. Pat. No. 4,008,884; U.S. Cl. 266-233; Int.Cl.$^2$ C 22 B 9/02, filed June 17, 1976, by Nigel Patrick Fitzpatrick, James Neville Byrnl et al., assignors to Alcan Research and Development Limited, Montreal, Canada.

This molten metal stirring method includes alternatingly withdrawing molten metal from the molten metal body into a confined space, e.g. a tubular vessel, to a certain level above the molten metal body in the bath, and expelling the withdrawn moltel metal into the molten metal body as a submerged high-velocity jet, for stirring the metal body, the submerged jet being directed horizontally within the lower part of the metal body, to a distance substantially in excess of the depth of this body.

In accordance with this known method, the alternating withdrawing and expelling stages are effectuated by supplying suction and pressurized gaseous fluid into the confined space above the molten metal body (i.e. into the top part of the tubular vessel), the withdrawing of the liquid metal being effected through an orifice of this vessel at a lower part of the molten metal body, and the expelling of the submerged jet taking place horizontally in the lower area of the metal body.

The method is further based on each suction stage including feeding out a suction signal upon measuring the suction value in the top portion of the vessel and monitoring the duration of the suction step in accordance with the suction value being maintained at a preset level, communicating the suction to raise the molten metal in the vessel, determining the level of the rising metal and terminating the suction supply upon the metal having risen to the predetermined level.

In accordance with the disclosure in the abovementioned U.S. Pat. No. 4,008,884, the apparatus for stirring molten metal includes a tubular vessel having at the lower extremity thereof a nozzle submerged into the molten metal body, the upper extremity of the tubular vessel having a device (of the aspiration type) for alternatingly withdrawing metal (by suction) into said vessel to a specified level above the molten metal body and expelling the withdrawn metal into the molten metal body via the nozzle under the action of the gaseous fluid. This gaseous fluid, i.e. air is supplied from a receiver into the aspiration device via charging and discharging solenoid valves.

The sequence of the charging and discharging operations is controlled by a vacuum switch and an electric timer. To preset the maximum permissible level of the raising of the molten metal, the internal space of the tubular vessel receives therein an electric level sensor connected with a switch-off relay.

However, the known method described above and apparatus for gas-dynamic stirring of liquid molten metals suffer from disadvantages which to a certain degree curb down their wider application.

The stationary arrangement of the tube of the pump in the bath of the furnace provides for active stirring within a limited area, which means that furnaces of great capacities require a plurality of such pumping arrangements.

When metal is molten in furnaces of either circular or square shape, even those of relatively small capacities, at least two pumps are to be installed to attain adequately swift melting and dissolving of the alloying additives. On the other hand, the arrangement of a plurality of the pumps on a melting furnace is often associated with difficulties, to say nothing of the increased consumption of compressed air. The withdrawal or expelling of the metal at a definite fixed height above the hearth of the furnace is in the way of employing to the fullest possible degree the broad capabilities of the method being discussed, from the point of view of the provision of the optimum conditions for heat and mass exchange. This drawback becomes particularly pronounced in the case of the melting of solid charge, when the temperature of the molten metal is still relatively low, and the washing over of the solid lumps of the charge with the relatively low-temperature metal jet would not yield the optimum outcome, as far as the melting rate and the utilization of the heat in the furnace are concerned.

In furnaces with molten metal bodies of a considerable depth the hitherto known method likewise would not yield the best results. In this case it is relatively difficult to select the optimum arrangement of the pumps vertically of the molten metal body, with the latter's level being variable within a relatively broad range.

Furthermore, the energy of the compressed-gas pulse is not utilized to the full capacity, with the compressed gas commencing its action upon either rising, or, in the best case, stationary portion of the liquid metal in the tube of the pump. This would not enable to attain the maximum speeds of the jet of the metal issuing from the tube of the pump for a given gas pressure. With the gas pressure being stepped up, the energy cost factor rises accordingly, with the conditions being created for an increased gas content in the metal.

The operation at a preset vacuum or suction value controlled by the suction switch for each individual pump would not enable to speed up noticeably the withdrawal of a metal portion into the tube of the pump, i.e. to cut the time of the withdrawal step. Moreover, the creation of the suction by the aspiration device mounted on the pump and put into action only following the termination of the supplying of the compressed-gas pulse via the respective solenoid-controlled valve obviously increases the time of withdrawing metal into the tube. In this case, too, there no efficient way of speeding up the withdrawal of the metal into the tube of the pump. The two last-discussed factors affect the efficiency of the operation of the pump, particularly, at the stage of melting solid charge, when the increased frequency of the alternation of the withdrawal-expelling cycles is required.

It is the main object of the present invention to create a method and apparatus for gas-dynamic stirring of molten liquid metals, which should enhance the efficiency of stirring liquid metals in high-capacity furnaces and should eliminate the drawbacks of the hitherto known methods and apparatus used for the same purpose.

It is a not less important of the present invention to create a method of gas-dynamic stirring of liquid molten metals, which should offer more economical and full utilization of the energy of the compressed gas.

It is an object of the present invention to provide a method of gas-dynamic stirring of liquid molten metals, which should enhance the metal quality by reducing the gas content therein.

It is a further object of the present invention to create an apparatus for gas-dynamic stirring, capable of performing the abovementioned method, which should provide for its accessible mouthing on high-capacity melting furnaces without any reconstruction of the latter, and which should provide conditions for effective stirring of the metal.

It is a still another object of the present invention to create an apparatus for gas-dynamic stirring of liquid molten metals, which should provide for reducing the gas saturation of the metal while the latter is being expelled.

These and other objects are attained in the herein disclosed method of gas-dynamic stirring of, liquid molten metals, including alternatingly withdrawing portions of the metal from the molten body into the tube of the pump by the use of suction and expelling these portions of the metal back into the molten body by acting thereupon by compressed-gas pulses, in which method, in accordance with the present invention, directly prior to the supplying of said compressed-gas pulse into the tube of the pump, the action of the suction is terminated, to provide for free descent of the raised metal portion by gravity.

This technical solution enables to step up the effectiveness of stirring molten metals in high-capacity for accelerating metal portions being expelled into the metal body to higher speeds, with the compressed-gas pulse acting upon the withdrawn metal portion which has already begun its descent under the gravity forces. In this case the entire energy of the compressed-gas pulse is spent on accelerating the metal portion already having some initial speed, which eventually results in the higher speed of the exit of the metal jet from the pump tube, and, hence, in a longer path of this jet within the molten metal body, which is essential for high-capacity plants. The action of the compressed-gas pump upon the retreating metal hampers the conditions of saturating the metal with the gas, as compared with their motion against each other.

It is expedient that prior to supplying said compressed-gas pulse to expel the withdrawn metal portion from the tube, the space in the tube of the pump above the metal portion should be communicated to the ambient atmosphere.

The above feature provides for a more economical use of the compressed-gas energy, owing to the arresting and preacceleration of the withdrawn metal portion being effected by the energy of the ambient atmosphere, with the metal being preaccelerated in this case by gravity alone. The energy of the compressed-gas pulse is then entirely spent on the acceleration of the already moving metal portion in the tube, which enables to step up the speed of the exit of the metal jet from the tube, to prolong the path of the jet within the molten metal body and to intensify the stirring process.

It is further expedient that the said compressed-gas pulse be timed with the commencing of the free gravity descent of the metal portion.

This feature enables to utilize the energy of the compressed gas to the highest degree, owing to the compressed gas stream passing the minimum necessary path to encounter the liquid metal in the tube, which has already begun its descent, so that its entire energy is spent on accelerating the metal.

It is still further expedient to perform the herein disclosed method of gas-dynamic stirring of molten liquid metals in an apparatus comprising a tube with a removable cover, a system for supplying a pulse of compressed gas from a pressure accumulator via a distributor into the outlet nozzle, a suction system for withdrawing metal portions, including a suction cut-off device, and a sensor of the metal level in the molten metal bath, in which apparatus, in accordance with the present invention, the outlet nozzle is directed upwardly toward the cover of the tube of the pump and is received within a movable annular sleeve with a shoulder, the cover having mounted therein rod-type valves cooperating with said shoulder of the movable sleeve to communicate the internal space of the tube with the ambient atmosphere, upon the valves being raised by the movable sleeve, the latter being operatively connected with a float submerged in the body of the raising metal portion.

The apparatus of this kind enables to mount the pump on a high-capacity melting furnace without the necessity of reconstructing the latter, and to provide the prerequisites for efficient stirring, owing to the device for communicating the internal space of the pump with the ambient atmosphere being accomodated within said space and employing for opening the communication the energy of the metal portion ascending in the tube. The operative connection of this device with the metal via the float ensures that the internal space of the pump is communicated with the ambient atmosphere each successive cycle of withdrawing a metal portion into the tube, and, consequently, provides the necessary prerequisites for attaining a high speed of the exit of the metal jet from the tube, when the oncoming compressed-gas pulse acts thereupon.

It is expedient, that said cover of the pump be provided on the internal side thereof with a tapering dissector of the gas stream, arranged axially of the outlet nozzle and merging with an annular toroidal cavity having said rod-type valves arranged in the indentation thereof.

This feature enables to create conditions for reducing the gas saturation of the metal being expelled by the action of the compressed-gas pulse thereupon, owing to the compressed-gas stream being dissected and uniformly distributed over the entire cross-section of the tube of the pump.

It is further expedient that the float be connected with the movable annular sleeve with aid of links of adjustable length, interconnected through detachment assemblies.

This feature enables to conduct the operation of the pump at different rates of the ascent of withdrawn metal portions in the tube, by adjusting the spacing between the float and the sleeve and by selecting their optimum relative positions in accordance with the ascent rate. Moreover, provision is made for replacing the float and the sleeve, whenever necessary.

It is further expedient that the cover of the tube of the pump should have mounted therein an electric contact device in the form of a probe wired into the circuit controlling the supplying of compressed-gas pulses, the length of this probe within the internal space of the tube being selected so that the time of the passage of the withdrawn metal portion along the probe up to the moment of the raising of the rod-type valves should be in excess of the time of the response of said system for supplying a compressed-gas pulse.

This feature enables to speed up the rate of the ascent of the metal in the tube of the pump, owing to the possibility of operating at suction values whereat the metal could have been theoretically raised above the cover of the pump. In this case it is feasible, and that without any additional monitoring and control means, to time the commencing of a compressed-gas pulse with the commencing of the gravity descent of the metal portion.

It is still further expedient that the said probe of the electric contact device be mounted in the cover of the tube of the pump in a collet chuck providing for the adjustment of the axial protrusion of this probe.

This feature enables to adjust the extent of the ascent of the metal along the probe, and, hence to time accurately the commencing of a compressed-gas pulse with the commencing of the gravity descent of the metal portion.

It is further expedient that said outlet nozzle should have at the inlet thereof the said suction cut-off device, connected in parallel with the system for withdrawing metal portions by suction and with the system for supplying compressed-gas pulses, the suction cut-off device including a movable nozzle mounted as a valve member in another outer conical nozzle and movable relative to the latter by a spring of which the effort is adjusted to close off the flow passage and to set one nozzle into the other one, as a compressed-gas pulse is supplied.

This feature enables to eliminate the influence of the suction system on the conditions created for timing the commencing of the compressed-gas pulse with the commencing of the gravity descent of the metal portion, owing to the vacuum or suction system becoming disconnected from the internal space of the tube of the pump at the supplying of the compressed-gas pulse and not interfering with the commencing of this gravity descent of the metal in the tube. The feature also facilitates the corresponding adjustment of the precise timing of the two operations.

Furthermore, the last-described feature enables to speed up the action of the apparatus, and, hence, the productivity of the pump, owing to neither specific equipment nor corresponding time being required for connecting the suction system to the internal space of the tube of the pump upon the termination of the action of a compressed-gas pulse. The frequency of the cycles, on the other hand, is in this case readily adjustable by incorporating and adjustment throttle governing the rate of the building up of suction in the tube, and, consequently, the rate of the withdrawal of a metal portion from the metal molten body.

The present invention will be further described in connection with its preferred embodiment in the following detailed description thereof, with reference being made to the accompanying drawings, wherein:

FIG. 1 illustrates schematically the state of a withdrawn metal portion in the tube of the pump;

FIG. 2 is a chart of variation of the speed of the motion of the metal portion being returned into the molten metal body, versus time;

FIG. 3 is a longitudinal sectional view of the stirring apparatus, with the control system shown schematically;

FIG. 6 is a diagram of the control system of the supply of compressed-gas pulses in the apparatus illustrated in FIG. 3;

FIG. 7 illustrates the mounting of the electric contact device—the probe—on the cover in the apparatus illustrated in FIG. 3;

FIG. 8 illustrates the suction cut-off device of the apparatus shown in FIG. 3.

Figure 4:
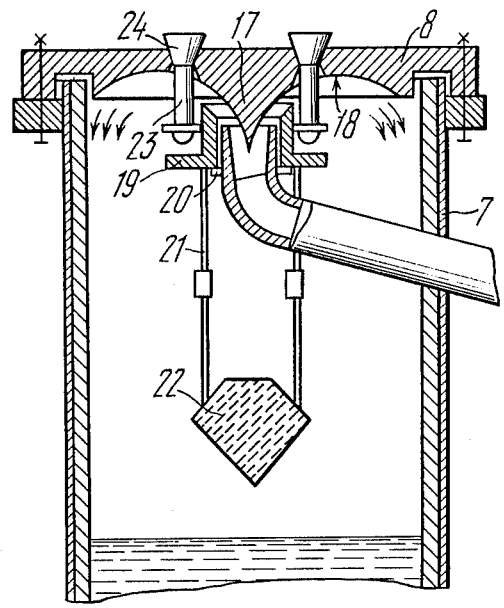
FIG. 4 is a sectional view of the end portion of the tube associated with the valve in the apparatus illustrated in FIG. 3, at the time of the supply of a compressed-gas pulse.

The conducting of the gas-dynamic stirring process in accordance with the disclosed method is schematically illustrated in the appended drawings, FIGS. 1 and 2, wherein there is shown the cycle diagram of the operation of the pump, related to the progress of the metal in the tube of the pump, corresponding to each successive step of the operating cycle of the pump, where:

V is the rate of the progress of metal in the tube, with the "+" and "−" signs designating, respectively, ascent and descent;

$\tau$ is time;

$P_1$ and $P_2$ are the pressure values, corresponding, respectively, to the main pulse /1/ and auxiliary pulse /2/.

The dash line in the drawing illustrates for comparison the acceleration of metal in the tube in accordance with the method of the prior art.

From the metal body in the bath 1, e.g. of a melting furnace, there is withdrawn into the tube of a gas-dynamic pump 2 a metal portion 3 (of a preset volume) at a certain rate +V, by suction in the working space 4 of the tube.

Then the metal portion in the tube is acted upon by an auxiliary pulse of a compressed gas at a pressure $P_2$, e.g. air under atmospheric pressure, with the suction supply being simultaneously cut off from the working interior of the tube of the pump. Owing to this, the rate of ascent of the metal drops to zero, so that the metal halts in the tube at a certain preset level, whereafter it starts descending in the tube, i.e. acquires an initial rate of the motion in the opposite direction. At this moment a control signal, i.e. one sent by a contact-type level sensor, initiates the supplying of the main compressed gas pulse, which accelerates the metal in the tube to a given speed. The metal jet issues at this speed into the molten metal body, engaging the adjacent metal layers and thus agitating the metal throughout the volume of the molten body.

Conducting the herein disclosed method with the timed feed of the two pulses is possible with either manual control from a control panel, or from a control computer, with aid of a specific device for cutting off the suction supply and commencing simultaneously the supply of the auxiliary pulse at a pressure precluding the saturation of the metal in the tube with gas. It is expedient to conduct the herein disclosed method with the auxiliary pulse being followed by the main pulse with a delay equalling the time of passage of the control action through the system.

Given hereinbelow is an example of employing the herein disclosed method at the melting of aluminum alloy, with the molten metal body being stirred at every melting stage in a melting furnace of the 30-ton capacity.

The gas-dynamic pump was operated with the frequency or rate of the supply of compressed-gas pulses within a range from 4 to 20 pulses per minute. While the metal portion in the tube was accelerated and expelled into the molten metal body, it was successively acted upon by two pulses. The first pulse—the auxiliary one—was with air under the pressure of 1 atmosphere abs., i.e. under the atmospheric pressure, by simultaneously cutting off the suction supply to the working space and communicating the latter with the ambient atmosphere. This resulted in the rate of ascent of the metal in the tube dropping from 1.2 m/s (at 0.4 atm suction) to zero and changing to a descent in 0.6...0.8 second, following the initiation of the auxiliary pressure pulse supply. So, in 0.5 second after the initiation of the auxiliary pulse supply the control signal was sent, and in about 0.1 second after that the actuating member—the distributor—responded, and the main pressure pulse at a 5.0 atm. pressure accelerated the metal from the initial rate of 0.5 m/s (following the termination of the action of the auxiliary pulse) to about 3.5 m/s by the time of the termination of the action of the main compressed-gas pulse.

Thus, in the abovedescribed manner there was effectuated the acceleration of metal portions for gas-dynamic stirring at every melting stage, irrespectively of the rate of the supplying of the pressure pulses, which enabled to cut down the melting time by 10%, as compared with the method of the prior art.

The abovedescribed stirring mode was maintained until the molten metal was poured out into the mixer.

The above example of conducting the method, quite understandably, does not by far restrict the parameters of the process or preclude other ways of conducting the method as defined in the claims to follow.

The herein disclosed method, as experience shows, enables to step up the efficiency of the stirring and to cut down the melting time by as much as 15%.

Figure 5:
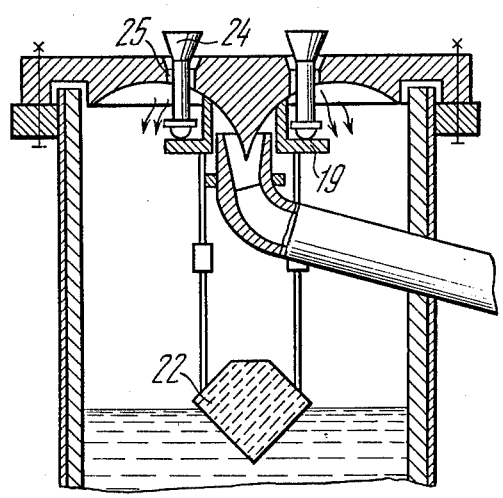
FIG. 5 is a sectional view of the end portion of the tube associated with the valve in the apparatus illustrated in FIG. 3, when the interior of the tube communicates with the ambient atmosphere.

Indicated with arrows in FIGS. 3, 4 and 5 of the appended drawings are the respective directions of the progress of the metal and of the gas streams. In a preferred embodiment, the pump for gas-dynamic stirring of liquid metal 5 in the bath of a furnace 6 includes an internally lined tube 7 with a removable cover 8 and a nozzle 9 having its outlet directed toward the cover 8. The nozzle 9 is connected via a line 10 with a device 11 for cutting off the vacuum or suction supply from the tube. The device 11 is also operatively connected with a distributor controlling the supplying of pulses of compressed gas (nitrogen, argon, etc.) from a pressure accumulator 13. The pressure accumulator 13 is of a given appropriate volume, with provisions for adjusting this volume in accordance with the pressure of the gas, maintained with a pressure regulator 14. The internal working space of the tube 7 is in permanent communication via the nozzle 9, the line 10 and an injector 11 with a suction line 15 including a controllable throttle 16 which enables to govern the rate of ascent of metal in the tube. There is a contact sensor (not shown) of the metal level in the tube, wired to send a control signal to the solenoid of the distributing valve 12.

The cover 8 is provided with a tapering dissecting element 17 adapted to dissect the stream of the gas, the dissecting element 17 being arranged axially of the nozzle 9 and merging with a torodial annular cavity 18 intended to stabilize the gas stream in the tube of the pump. The nozzle 9 is encompassed by an annular sleeve 19 with a shoulder, movable along this nozzle 9. The sleeve 19 abuts against a ring 20 adjustable longitudinally of the nozzle, in which way the required clearance between the sleeve 19 and the cover 8 can be set. The sleeve 19 is operatively connected by adjustable-length links 21 to a float 22. This connection enables to adjust the spacing between the sleeve 19 and the float 22, and thus to time the moment when the sleeve 19 closes away the suction line and communicates the working space with the ambient atmosphere. The float 22 is preferably made of a lightweight refractory material, e.g. asbestos-thermosilicate and the like, or else it can be a hollow member with the case made of a metal insoluble in the alloy being stirred. The float 22 is preferably streamlined to minimize its opposition to the gas stream. It may have an arcuate top, or a truncated bottom; alternatively, it may be droplet-shaped, conical, etc. Freely suspended from the cover 8 are rod-type valves 23 with dishes 24 adapted to close the passages 25 communicating the working space of the tube 7 with the ambient atmosphere. In a modification of the apparatus, this communication is not with the ambient air, but with a space filled with a gas under gauge pressure below that in the pressure accumulator, to provide a "soft" pulse.

The herein disclosed pump operates, as follows.

With the metal 5 filling the bath of the furnace 6 to a certain level whereat the outlet of the tube 7 is not exposed, the suction line 15 is connected to the internal working space of the tube 7, and the pressure accumulator 13 is connected to a compressed-gas source via the distributing device 12 and the pressure regulator 14. Simultaneously voltage is supplied to the coil of the solenoid of the distributing device 12; the rod of the contact sensor being lowered to a preselected level, depending on the setting of the throttle 16 and the relative positions of the float 22 and the sleeve 19.

The suction raises the liquid metal into the tube 7 to a certain height, the float 22 with the sleeve 19 being raised accordingly. Eventually the sleeve 19 raises the rod-type valves 23 by its shoulder, the dishes or valve members 24 opening the passages 25 communicating the interior of the tube with the ambient atmosphere, while the sleeve 19 starts closing the connection between the working space of the tube and the suction source. The metal ascends at a slowing rate and at a certain moment stops on account of the lifting force resulting from the pressure drop and the weight of the metal counterbalancing each other. At this moment the contact-type level sensor responds, and the solenoid of the distributor 12 operates, whereby the pressure accumulator 13 becomes connected with the working interior of the tube 7 via the injector 11, the line 10 and the nozzle 9, the injector cutting off the suction supply, and the compressed gas from the pressure accumulator 13 swiftly flowing into the working space. The pressure pulse acts upon the metal body in the tube and expels it at a high velocity into the molten metal body in the bath. The duration of the pulse can be extended by any suitable known per se means used for the purpose. The metal portion expelled in a high-velocity jet from the tube advances through the bath and engages the adjacent layers of the molten metal body, in which way the whole volume of the molten metal body in the bath is agitated.

Upon the metal in the tube clearing the rod of the contact sensor, the solenoid of the distributing device 12 is deenergized, and the compressed gas is supplied into the pressure accumulator 13 from the compressed gas source. Then another portion of liquid metal is withdrawn by suction into the tube, and the abovedescribed operating cycle of the apparatus is repeated.

The apparatus in accordance with the present invention is operable equally efficiently with the tube of the pump being either stationary or movable.

The herein disclosed pump enables to step up the efficiency of the melting process and to cut down the melting time, e.g. of aluminum alloys by as much as 15%.

The cover 26 of the apparatus has mounted thereon, in the presently described embodiment, the main contact-type level sensor of which the probe 27 is connected to one of the contacts of the solenoid of the distributing device 28, while 12 V voltage is supplied to the other contact. The metal body in the bath is earthed, therefore, upon the metal contacting the probe 27, the solenoid of the distributing device operates, with the line "12 V voltage source—earth" being completed.

The probes 27 of the contact-type sensors are mounted in nut-tightened collet chucks 29, which enables to easily adjust the spacing of the probes from the cover 26, and thus to adjust the operative volume of the working space of the tube 30. By throttling, it is possible to adjust the time of attaining the required subatmospheric pressure in the working space of the tube, and thus to adjust the rate of the ascent of the metal to the preset height.

The herein described embodiment of the apparatus operates, as follows.

With the molten metal in the bath of the furnace attaining a given permissible level whereat the outlet of the tube 30 is not exposed, the vacuum or suction line 31 is connected to the working space of the tube 30, and the pressure accumulator 32 is connected to a compressed gas source via the distributing device 28 and the pressure regulator 33. Simultaneously, voltage is supplied to the coils of the solenoids of the distributing device 28, the probes 27 of the level sensors having been lowered to a preselected level in accordance with the setting of the throttling member governing the rate of ascent of the metal in the tube 30 at the given subatmospheric pressure—suction—in the suction system.

The liquid metal is lifted by suction in the tube 30 to the preset height whereat it contacts the probe 27 of the contact sensor, whereby the electric line "earth—12 V source" is completed, and the solenoid of the distributing device 28 operates. The pressure accumulator 32 is connected to the working space of the tube 30 via the line 31 and the nozzle 34, and the compressed gas stored in the pressure accumulator swiftly flows into the working space. The compressed-gas pulse acts upon the body of metal in the tube and expels it in a high-velocity jet into the metal body in the bath. The portion of the liquid metal expelled from the tube moves through the metal body in the bath, engaging the adjacent layers of metal and thus agitating the entire metal body in the bath.

Upon the metal in the tube clearing the probe 27, the completed electric line "earth—voltage source" becomes broken, the solenoid of the distributing device 28 is deenergized, and compressed gas starts flowing into the pressure accumulator 32 from the pressure line 35. Then liquid metal is once again withdrawn by suction into the tube, and the abovedescribed cycle of the operation of the apparatus is repeated.

The abovespecified structure of the apparatus for stirring liquid metal offers a greater efficiency and capacity, owing to the filler utilization of the working volume of the tube, with relatively high suction values in the system.

Described hereinbelow in more detail is the preferred embodiment of the suction cut-off device of the gas-dynamic pump.

The suction cut-off device of the gas-dynamic pump for stirring molten metal includes the chamber of the stationary nozzle 36. Received within the nozzle 36 is a movable nozzle 37 connected via the line 31 (FIG. 6) with the distributing device 28 of the system supplying pulses of compressed gas (nitrogen, argon, etc.), from the pressure accumulator 32 filled from the pressure supply line through the pressure regulator 33. Interposed between the shoulder 38 of the nozzle and the annular groove 39 merging with the tapering surface 40 of the chamber is a resilient member, e.g. a compression spring 44 maintaining the nozzle 37 in a suspended or floating state. The clearance between the end face of the nozzle 37 and the tapering surface 40 is adjustable with aid of a lid 41 threadedly connected with the nozzle 36. The outlet portion of the nozzle 37 has made therein passages 42 communicating the compressed-gas pulse supply line with the space 43 intermediate the external and internal surfaces of the nozzle 37 and of the chamber of the nozzle 36, respectively. The device operates, as follows.

In the initial position, shown in FIG. 8, the suction line 44 communicates with the chamber of the nozzle 36, while compressed gas is supplied via the distributing device 28 (FIG. 6) into the pressure accumulator 32. With the distributing device 28 switching over, the compressed gas stored in the accumulator 32 flows via the line 31 to the nozzle 37 (FIG. 8). With the gas flowing through the nozzle 37, there is created a pressure drop across the nozzle, i.e. before and after the nozzle. At the same time, compressed gas flows via the passages 42 into the chamber 43 and acts upon the area defined by the surface of the shoulder of the nozzle. The nozzle 37 is driven by the pressure of compressed gas upon the shoulder 38 until the end face of the nozzle 37 abuts against the tapering surface 40 of the passage, cutting off the suction supply line from the internal space of the tube. The spring 44 is compressed by this same effort and remains compressed until the compressed-gas pulse is terminated. With the pulse terminated, the spring 44 returns the nozzle 37 upwardly into the initial position.

Then the abovedescribed operating cycle is repeated in the same sequence.

The last-described general structure can be associated both with a stationary pump tube and a mobile one, its incorporation enabling to step up the productivity of the pump used with suction plants by 8 ... 10% on the average.

We claim:

1. In a method of gas-dynamic stirring of molten metals, including alternatingly withdrawing metal portions from the molten metal body into the tube of a pump by suction and expelling these metal portions back into the molten metal body by the action thereupon of compressed-gas pulses, the improvement comprising, directly prior to the supplying of said compressed-gas pulse into the tube of the pump, cutting off the action of the suction, to provide for free descent of the lifted metal portion by gravity forces.

2. A method of gas-dynamic stirring of molten liquid metals, as set forth in claim 1 wherein, prior to the supplying of said compressed-gas pulse to expel from the tube the withdrawn metal portion, the internal space of the tube of the pump is communicated with the ambient atmosphere.

3. A method of gas-dynamic stirring of molten liquid metals, as set forth in claim 1, wherein said compressed-gas pulse is timed to the commencing of the free gravity descent of the metal portion.

* * * * *